(12) United States Patent
Boulter

(10) Patent No.: US 7,448,600 B1
(45) Date of Patent: Nov. 11, 2008

(54) FLOATING WASTEWATER EVAPORATOR

(76) Inventor: Roger P. Boulter, 26125 N. White Ranch Rd., La Feria, TX (US) 78559

( * ) Notice: Subject to any disclaimer, the term of this patent is extended or adjusted under 35 U.S.C. 154(b) by 0 days.

(21) Appl. No.: 11/859,024

(22) Filed: Sep. 21, 2007

Related U.S. Application Data

(60) Provisional application No. 60/896,411, filed on Mar. 22, 2007.

(51) Int. Cl.
*B01F 3/04* (2006.01)
(52) U.S. Cl. .................. 261/28; 261/78.2; 261/120; 159/4.4
(58) Field of Classification Search ............. 261/25, 261/28, 30, 34.1, 78.2, 120, DIG. 65; 159/4.4; 210/747, 170.05, 170.06, 170.08, 242.2; 239/222.11, 222.17
See application file for complete search history.

(56) References Cited

U.S. PATENT DOCUMENTS

| | | | |
|---|---|---|---|
| 2,079,117 A | 5/1937 | Hayes | |
| 3,610,567 A | 10/1971 | Ericson | |
| 3,622,074 A | 11/1971 | Frohwerk | |
| 3,669,422 A | 6/1972 | Nogaj | |
| 3,785,558 A | 1/1974 | Albritton et al. | |
| 3,998,389 A | 12/1976 | Rose et al. | |
| 4,001,077 A | 1/1977 | Kemper | |
| 4,409,107 A | 10/1983 | Busch | |
| 4,449,849 A | 5/1984 | Horn et al. | |
| 4,587,064 A | 5/1986 | Blum | |
| 4,609,145 A * | 9/1986 | Miller | 239/77 |
| 4,680,148 A * | 7/1987 | Arbisi et al. | 261/120 |
| 4,681,711 A | 7/1987 | Eaton | |
| 4,713,172 A | 12/1987 | Horn et al. | |
| 4,762,276 A | 8/1988 | Foust | |
| 4,906,359 A | 3/1990 | Cox, Jr. | |
| 5,004,531 A | 4/1991 | Tiernan | |
| 5,032,230 A | 7/1991 | Shepard | |
| 5,185,085 A * | 2/1993 | Borgren | 210/747 |
| 5,227,067 A | 7/1993 | Runyon | |
| 5,244,580 A | 9/1993 | Li | |
| 5,381,742 A | 1/1995 | Linton et al. | |
| 5,454,939 A | 10/1995 | Meuche | |
| 5,499,490 A | 3/1996 | Minnich | |
| 5,768,866 A | 6/1998 | Minnich | |
| 5,783,084 A | 7/1998 | Suenkonis | |
| 5,874,003 A | 2/1999 | Rose | |
| 5,971,372 A * | 10/1999 | Ash | 261/120 |
| 6,083,405 A * | 7/2000 | Tanaka et al. | 210/739 |

(Continued)

FOREIGN PATENT DOCUMENTS

CN 1820576 8/2006

(Continued)

*Primary Examiner*—Scott Bushey
(74) *Attorney, Agent, or Firm*—Rick Martin; Patent Law Offices of Rick Martin, P.C.

(57) ABSTRACT

A working pontoon raft has frame that supports a plurality of high speed evaporator fans. An on board pump draws wastewater from under the raft and feeds it to the fans. Large amounts of wastewater from industrial reservoirs, such as oil drilling reservoirs, are evaporated into the air in an environmentally friendly manner. Power is supplied to the raft via hydraulic lines. A land base generator supplies the hydraulic power. The entire system fits on a custom trailer.

20 Claims, 13 Drawing Sheets

U.S. PATENT DOCUMENTS

| | | | |
|---|---|---|---|
| 6,182,463 | B1 | 2/2001 | Strussion et al. |
| 6,190,498 | B1 | 2/2001 | Blagborne |
| 6,272,874 | B1 * | 8/2001 | Keeney ................. 62/240 |
| 6,309,542 | B1 | 10/2001 | Kim |
| 6,325,362 | B1 * | 12/2001 | Massey et al. ............ 261/127 |
| 6,348,147 | B1 | 2/2002 | Long |
| 6,367,278 | B1 | 4/2002 | Strussion et al. |
| 6,582,552 | B1 | 6/2003 | Juhola |
| 6,637,379 | B2 | 10/2003 | Hays et al. |
| 6,824,124 | B2 | 11/2004 | Henley |
| 6,875,351 | B2 | 4/2005 | Arnaud |
| 6,948,881 | B1 | 9/2005 | Fredriksson et al. |
| 7,022,242 | B2 | 4/2006 | Sacchi |
| 7,166,229 | B2 | 1/2007 | Cote et al. |
| 7,210,637 | B1 * | 5/2007 | Johnson ................. 239/34 |
| 2002/0079598 | A1 | 6/2002 | Kedem et al. |
| 2003/0062004 | A1 | 4/2003 | Hayes et al. |
| 2004/0045682 | A1 | 3/2004 | Liprie |
| 2004/0086816 | A1 | 5/2004 | Hayes et al. |
| 2006/0032797 | A1 | 2/2006 | Tsai |
| 2006/0162349 | A1 * | 7/2006 | Edwards et al. ........... 62/121 |

FOREIGN PATENT DOCUMENTS

| | | |
|---|---|---|
| CN | 1820576 | 6/2007 |
| DE | 3425852 | 1/1986 |
| DE | 29805795 U1 | 3/1998 |
| DE | 298057950 | 3/1998 |
| ES | 2024097 | 2/1992 |
| ES | 2157798 | 8/2001 |
| GB | 190000085 | 4/1900 |
| JP | 55112987 | 9/1980 |
| JP | S55-112987 | 9/1980 |
| JP | 5317877 | 12/1993 |
| JP | H05-317877 | 12/1993 |
| JP | 7008987 | 1/1995 |
| JP | H07-008987 | 1/1995 |
| JP | 108196 | 4/1996 |
| JP | 8108197 | 4/1996 |
| JP | 8108198 | 4/1996 |
| JP | 8108199 | 4/1996 |
| JP | H08-108196 | 4/1996 |
| JP | H08-108197 | 4/1996 |
| JP | H08-108198 | 4/1996 |
| JP | H08-108199 | 4/1996 |
| JP | 8244679 | 9/1996 |
| JP | H08-244679 | 9/1996 |
| JP | 9253692 | 9/1997 |
| JP | H09-253692 | 9/1997 |
| JP | 2003-175394 | 6/2003 |
| JP | 2003175394 | 6/2003 |
| RU | 2128317 | 3/1999 |
| RU | 2168133 | 5/2001 |
| RU | 2215960 | 11/2003 |
| TW | 533087 B | 5/2003 |
| TW | 533087 B | 9/2007 |

* cited by examiner

US 7,448,600 B1

FLOATING WASTEWATER EVAPORATOR

CROSS REFERENCE APPLICATIONS

This application is a non-provisional application claiming the benefits of provisional application No. 60/896,411 filed Mar. 22, 2007.

FIELD OF INVENTION

The present invention relates to using multiple high speed atomizing fans mounted on a floating device to evaporate wastewater such as oil field production water or other water created from various oilfield operations.

BACKGROUND OF THE INVENTION

Drilling, completion operations and production operations for oil and gas often creates millions of gallons of wastewater. This wastewater is often pumped into a reservoir. The wastewater must be removed for continuous operations. Off-site disposal and trucking the wastewater is costly. Natural evaporation is slow and inefficient. What is needed is a cost efficient way to remove large quantities of wastewater with as minimal environmental impact as possible.

U.S. Pat. No. 4,449,849 (1984) to Horn et al. discloses an oil drilling wastewater evaporator using a land based pump to spray via nozzles the water all around the edge of the reservoir back into the reservoir. A float can support a splashplate to increase the rate of evaporation from the land based nozzle.

The present invention provides a floating device that supports over a dozen high speed atomizing fans. The floating device is tethered from the sides of the reservoir or anchored in the reservoir. Power (preferably hydraulic) is supplied from a land based power unit. Hydraulic fluid, once cycled for power to the fans and the water pump, is used to pre-heat the water, thereby adding efficiency to the entire system. This hydraulic fluid also is used to transport the land based engine cooling heat out to the unit. Another heat exchanger on the land based power unit removes the heat from the coolant and adds it to the oil coming back from the return lines before it goes to the storage tank. All the components can be mounted on a custom trailer to enable portability among several sites.

SUMMARY OF THE INVENTION

An aspect of the present invention is to provide a working floating device that carries a plurality of high speed atomizing fans to evaporate industrial wastewater safely into the air.

Another aspect of the present invention is to power the raft from a land based power unit, preferably hydraulic.

Another aspect of the present invention is to provide portability of the entire system on a trailer.

Another aspect of the present invention is to use the heat from the hydraulic fluid and engine cooling heat to pre-heat the wastewater.

Another aspect of the present invention is to provide a floating underwater pump inlet assembly having a screen and a variable depth mounting means.

Other aspects of this invention will appear from the following description and appended claims, reference being made to the accompanying drawings forming a part of this specification wherein like reference characters designate corresponding parts in the several views.

A pontoon floating device has a support frame on top of the pontoons. A water inlet assembly is supported beneath the frame by a pair of extension rods having a selectable immersion depth. The circulating pump and (preferably) fourteen evaporator fans are (preferably) hydraulically powered from a land based diesel power unit and hydraulic pump. A reel on the land based pump supports by hydraulic power lines to the raft at variable distances so that the raft can be positioned in a reservoir.

The evaporator fans are fed pre-heated wastewater using the spent hydraulic fluid and engine heat as a heat source. Piping for the pump and fans is supported on the frame.

The entire system is portable when mounted on a custom trailer. In use large volumes of wastewater are evaporated off the reservoir at an economically feasible cost.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
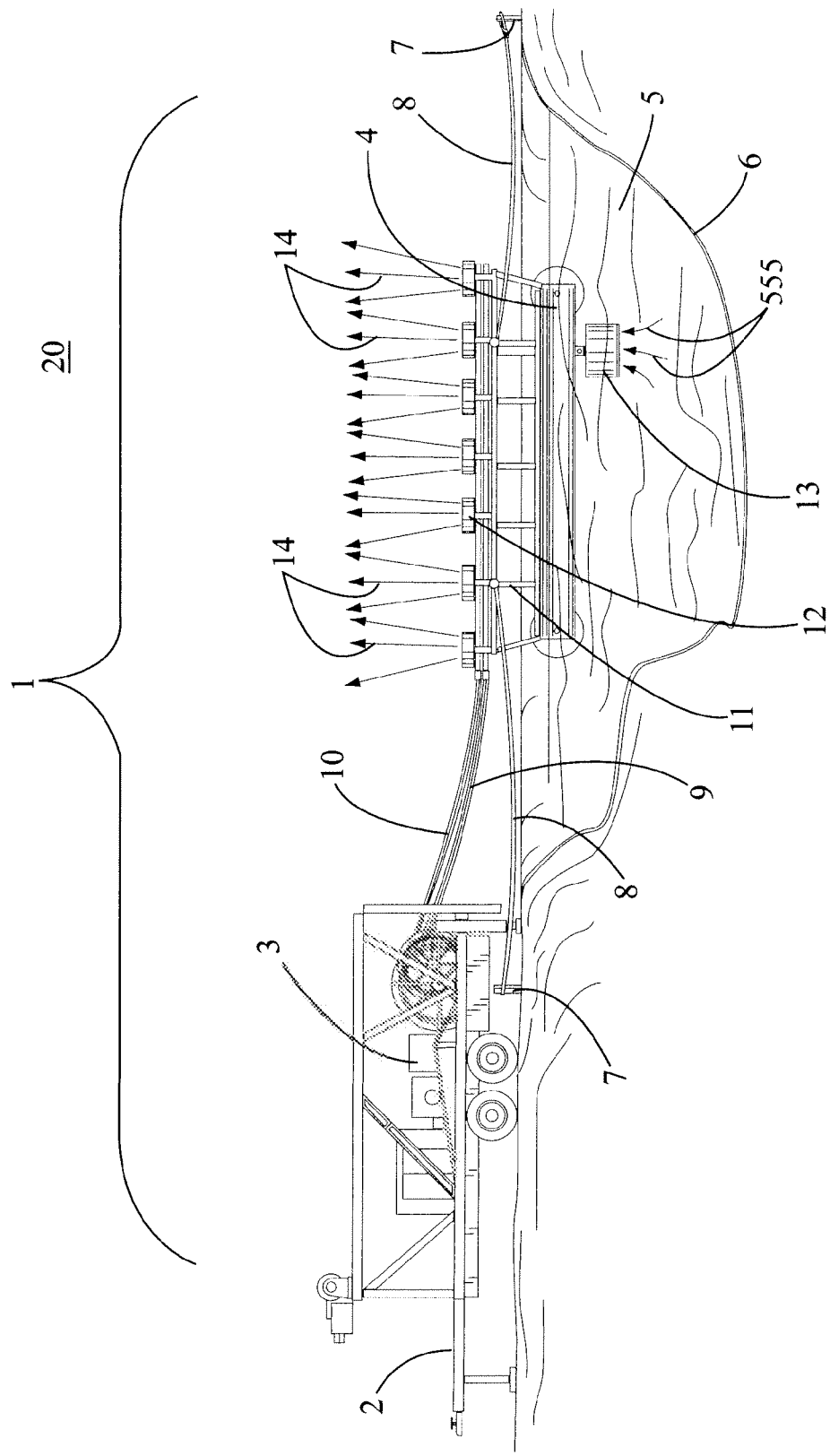
FIG. 1 is a perspective view of the entire system in use on a wastewater reservoir.

Referring first to FIG. 1 the evaporator system 1 comprises a trailer 2, a land based generator 3 and a raft 4. A wastewater reservoir 5 is generally lined 6. In use the raft 4 may be anchored to posts 7 with ropes 8. Hydraulic power lines 9 supply hydraulic power to the raft 4, and return lines 10 connect to the power unit return.

A frame 11 on the raft 4 supports (nominally) fourteen atomizing fans 12. In operation a pump inlet assembly 13 supplies wastewater 555 to the fans 12 which atomize the wastewater 555 into micro droplets 14. Thus, the wastewater 555 becomes evaporated into the atmosphere 20 in an environmentally friendly manner as the micro droplets 14 are evaporated into the atmosphere 20.

Figure 2:
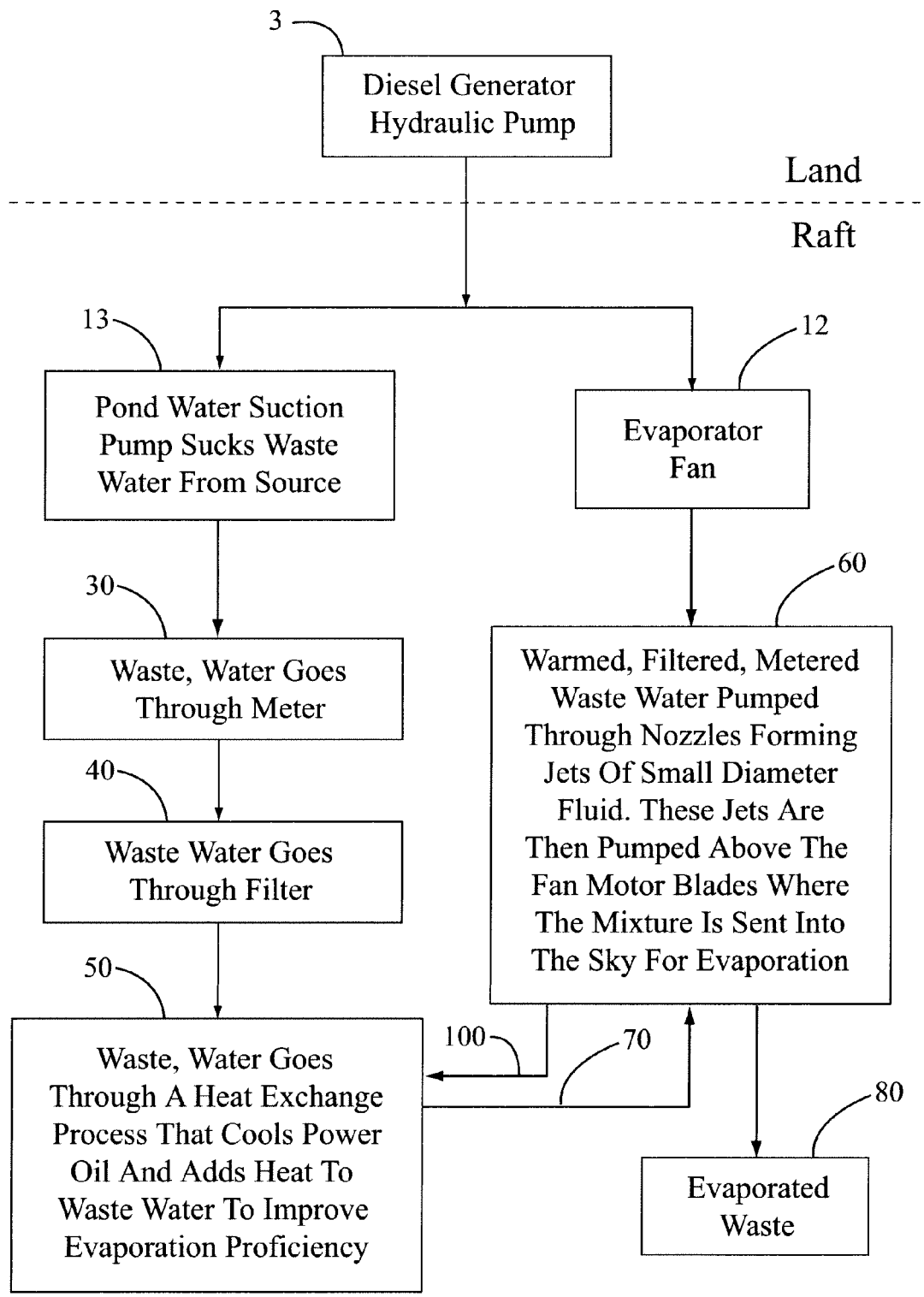
FIG. 2 is a functional flow chart of the system components.

Referring next to FIG. 2 the preferred power unit 3 consists of a diesel powered hydraulic pump. It powers the pump P which pulls wastewater 555 through the pump inlet assembly 13 and is filtered at 40 then through a water meter 30, then heated by the spent hydraulic fluid at 50 via pipes 100.

Next the water is sent to the evaporator fans at 60 via pipes 70. Finally, the fans evaporate the water to atmosphere at 80.

Figure 3:
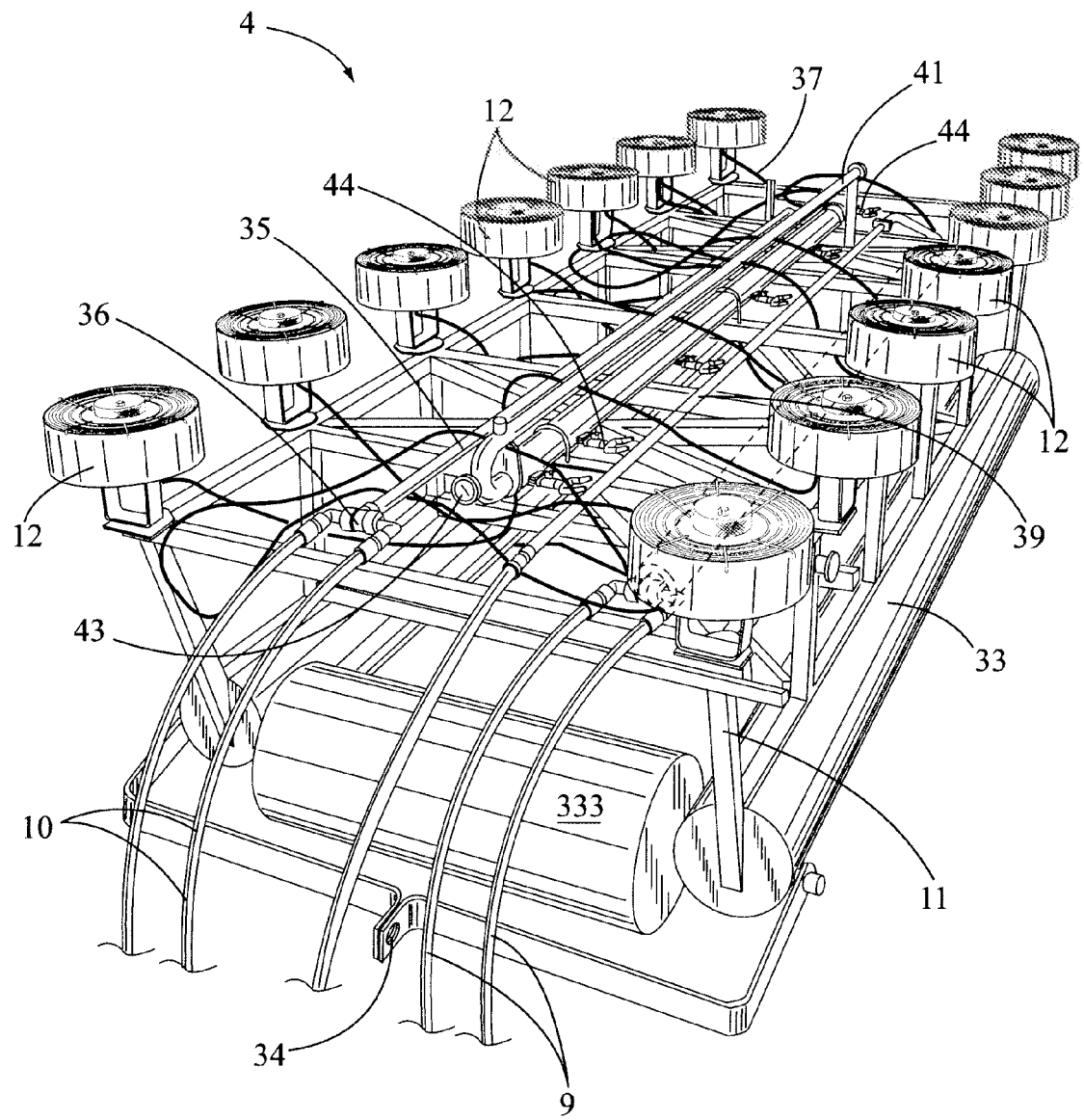
FIG. 3 is a front perspective view of the raft.
Figure 4:
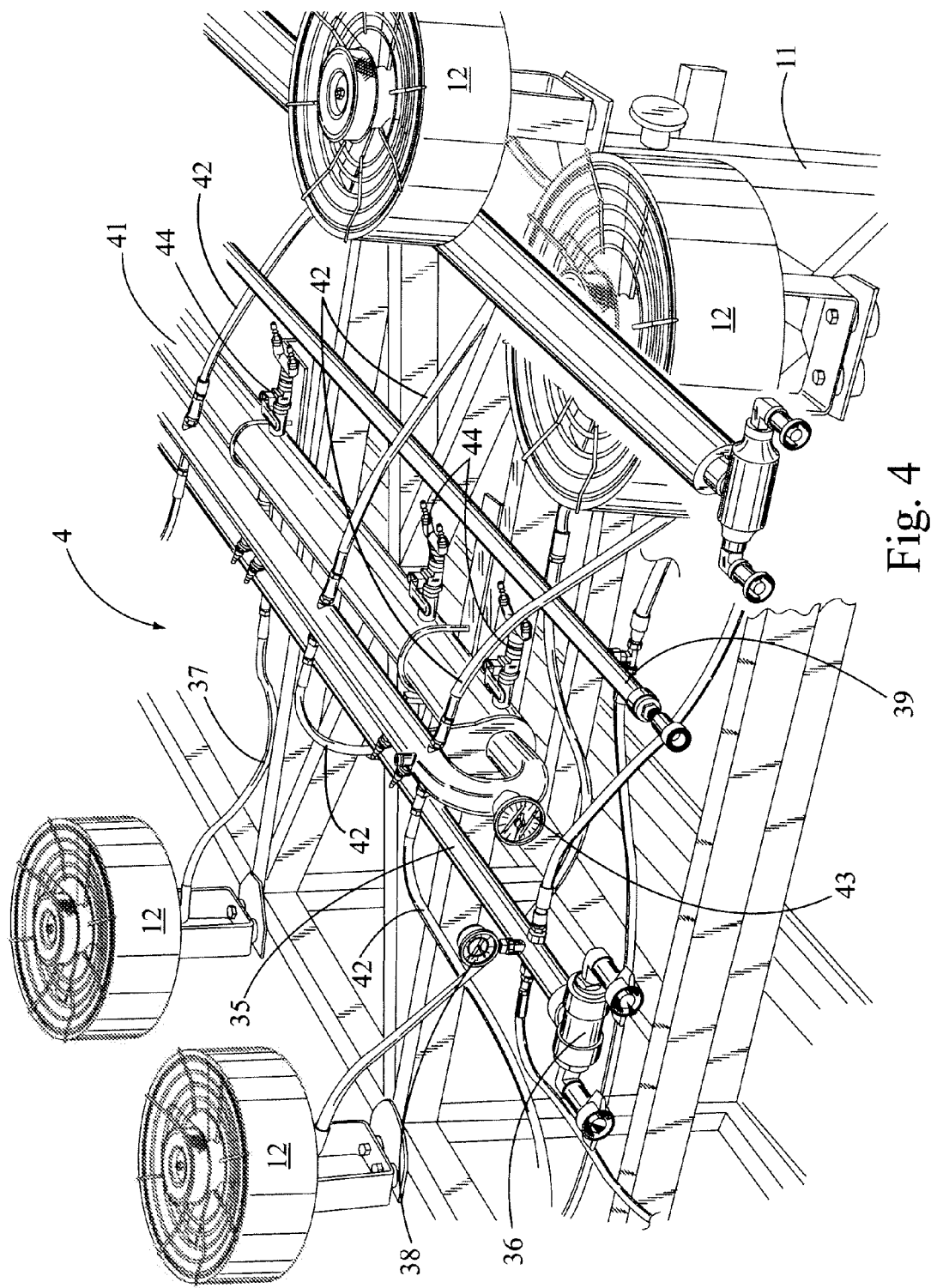
FIG. 4 is a top perspective view of the raft frame, piping and fans.

In FIGS. 3, 4 the floating device 4 can be towed at hitch 34. Two longitudinal pontoons 33 and two transverse pontoons 333 may be used to support the frame 11. Fourteen prior art fans 12 are used in the test craft. Two hydraulic lines 10 are fed into a supply manifold 35 via a Y connector 36. Each fan 12 has a hydraulic feed line 37. Gauge 38 indicates hydraulic manifold pressure. Hydraulic return lines 400 are fed to manifold 401 which then feeds return lines 10 of FIG. 1.

A hydraulic reservoir (not shown) is fed by drain line 39 to drain the hydraulic fan motors of excess hydraulic oil. The water pump P feeds a water manifold 41 wherein each fan 12 has a water feed line 42. A gauge 43 indicates water manifold pressure. Hydraulic return lines 400 are fed to manifold L101 which then feeds return lines 10 of FIG. 1.

Figure 5:
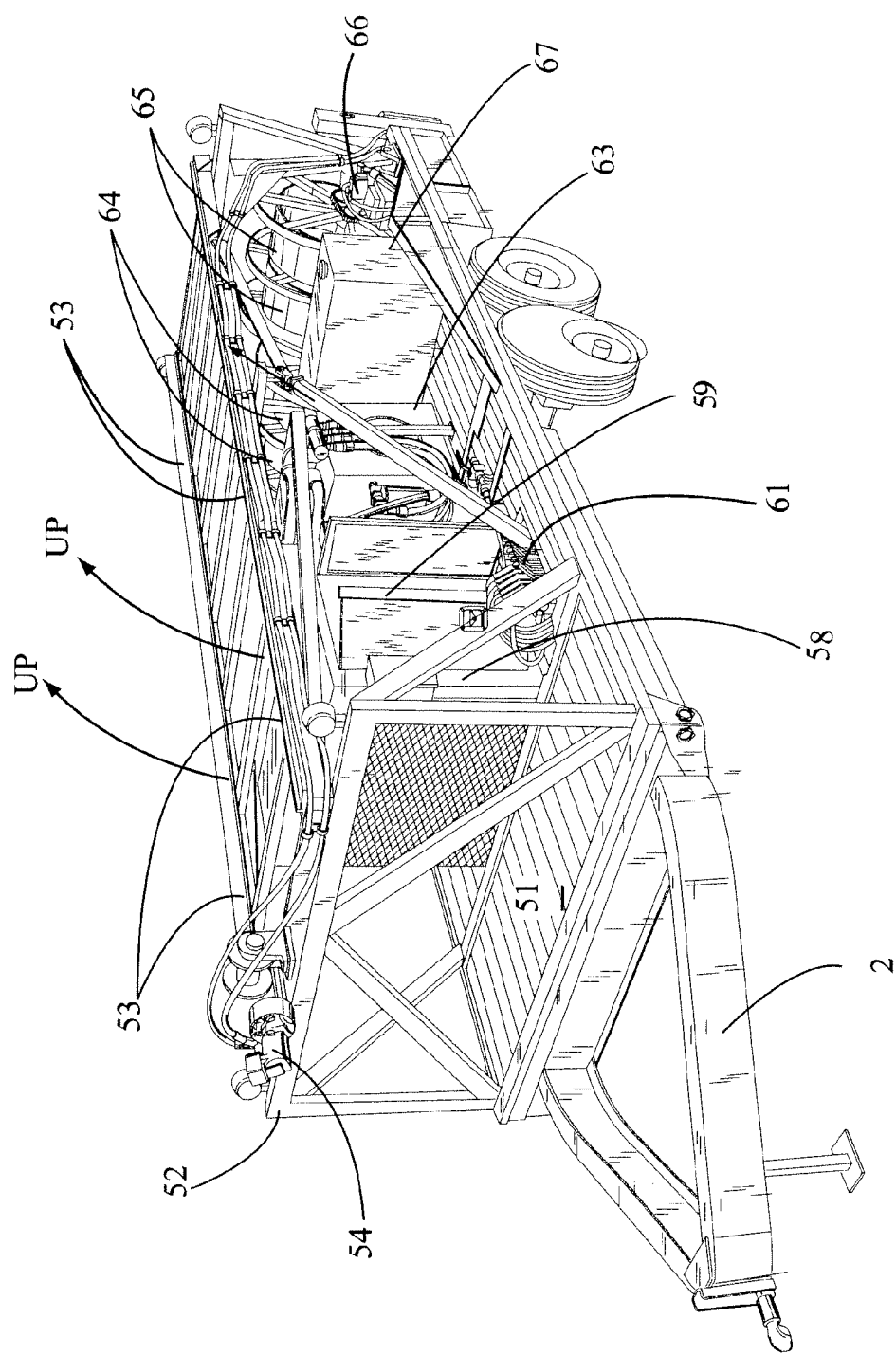
FIG. 5 is a front perspective view of the trailer loaded with the land system.

Referring next to FIG. 5 the trailer has a conventional set of wheels and a flat floor 51. A frame 52 supports a track 53 that can hold the floating device 4. Arrows UP show how the track 53 is hydraulically lifted at the front end to provide a ramp for the loading of the raft 4. A hoist motor 54 controls the loading/unloading of the raft 4 via a cable 101 shown in FIG. 10.

The diesel housing 58 protects a diesel engine 59. Hydraulic controls 61 control the lift 62 shown in FIG. 10 and the hydraulic fluid tank 63 and pump 1251 of FIG. 13 which powers the fans 12 and pump P. Hydraulic power reels 64 supports lines 10, and return reels 65 support the return lines 9. A reel motor 66 powers the reels 64, 65. Diesel fuel tank 67 is mounted to balance the trailer 2.

Figure 10:
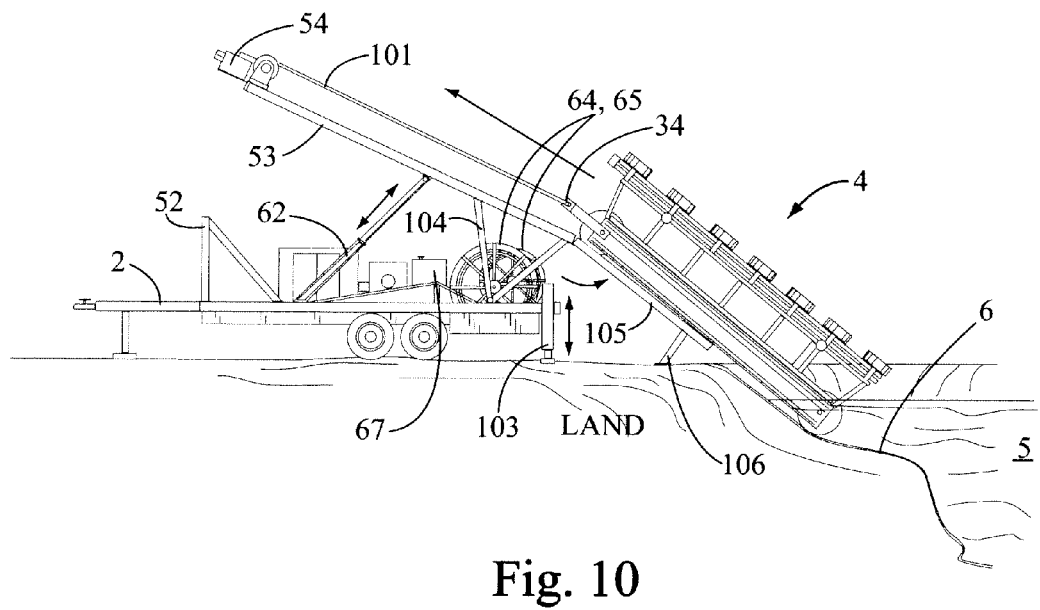
FIG. 10 is a side perspective view of the raft being loaded on top of the trailer.
Figure 11:
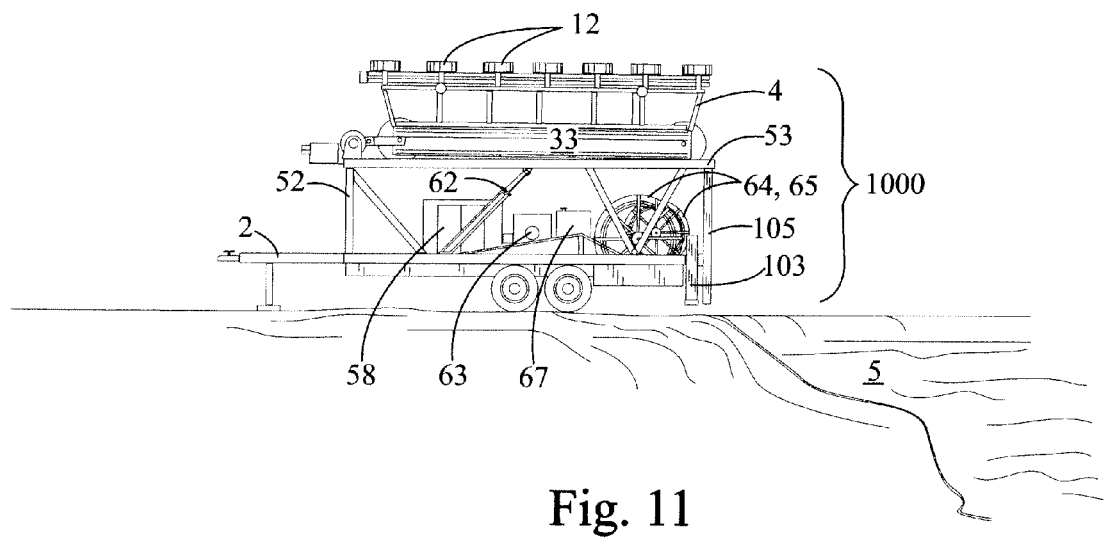
FIG. 11 is a side perspective view of the fully loaded trailer.

In FIG. 10 the hydraulic stabilizers 103 are set to support the weight of raft 4. A pivot assembly 104 supports the track 53 during the load/unload operation. A tailgate 105 and support 106 provide a ramp for the raft 4. In FIG. 11 the entire evaporator system 1000 is ready to move to another reservoir.

Figure 6:
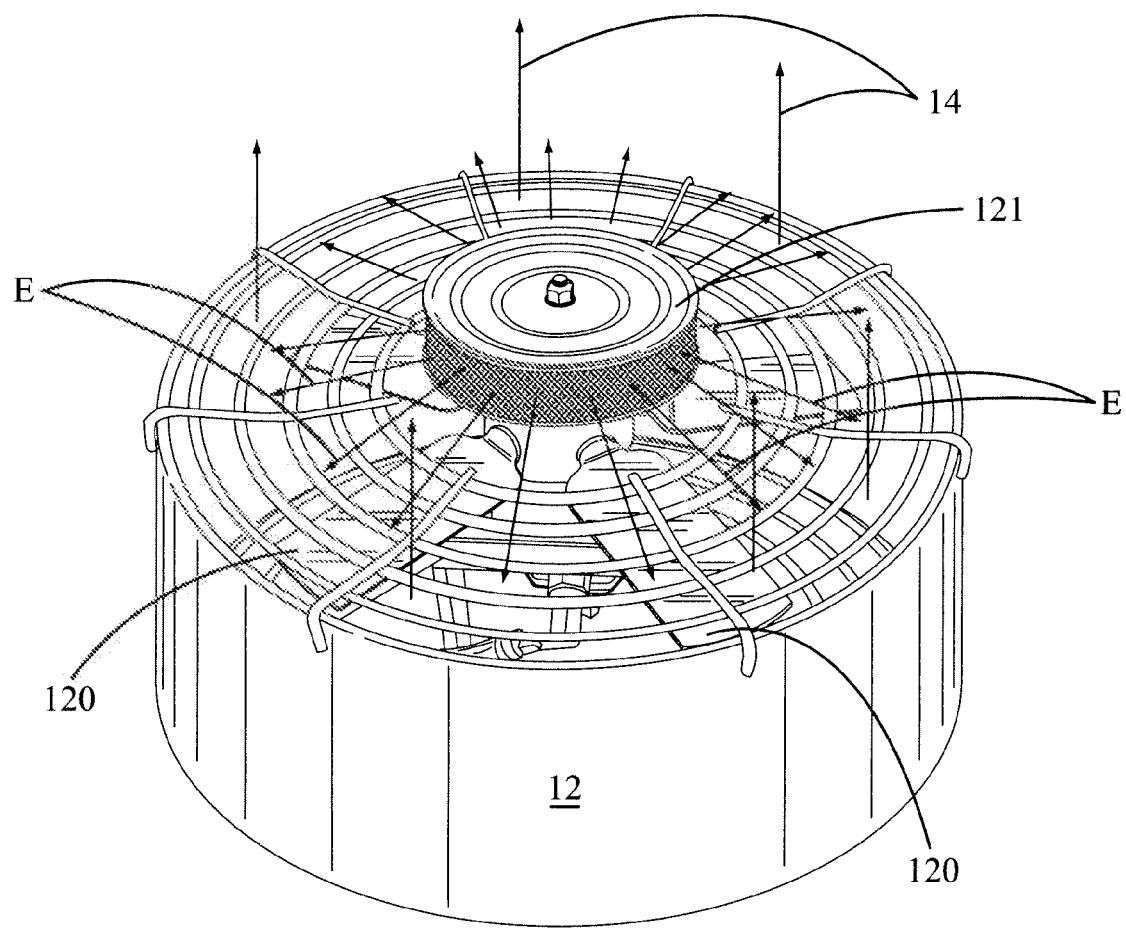
FIG. 6 (prior art) is a top perspective view of the operator fan.

Referring next to FIG. 6 (prior art) the fan 12 is preferably a Proptec™ made by Ledebuhr Industries, Inc. www.proptec.com. It is designed as a crop sprayer. A finned pitched blade 120 rotates at high speed to generate 10,000 (as per mark Ledebuhr) cubic feet per minute airflow.

A dissipater 121 ejects water out over the blade 120 as shown by arrows E. Micro droplets 14 are blown into the atmosphere.

Figure 7:
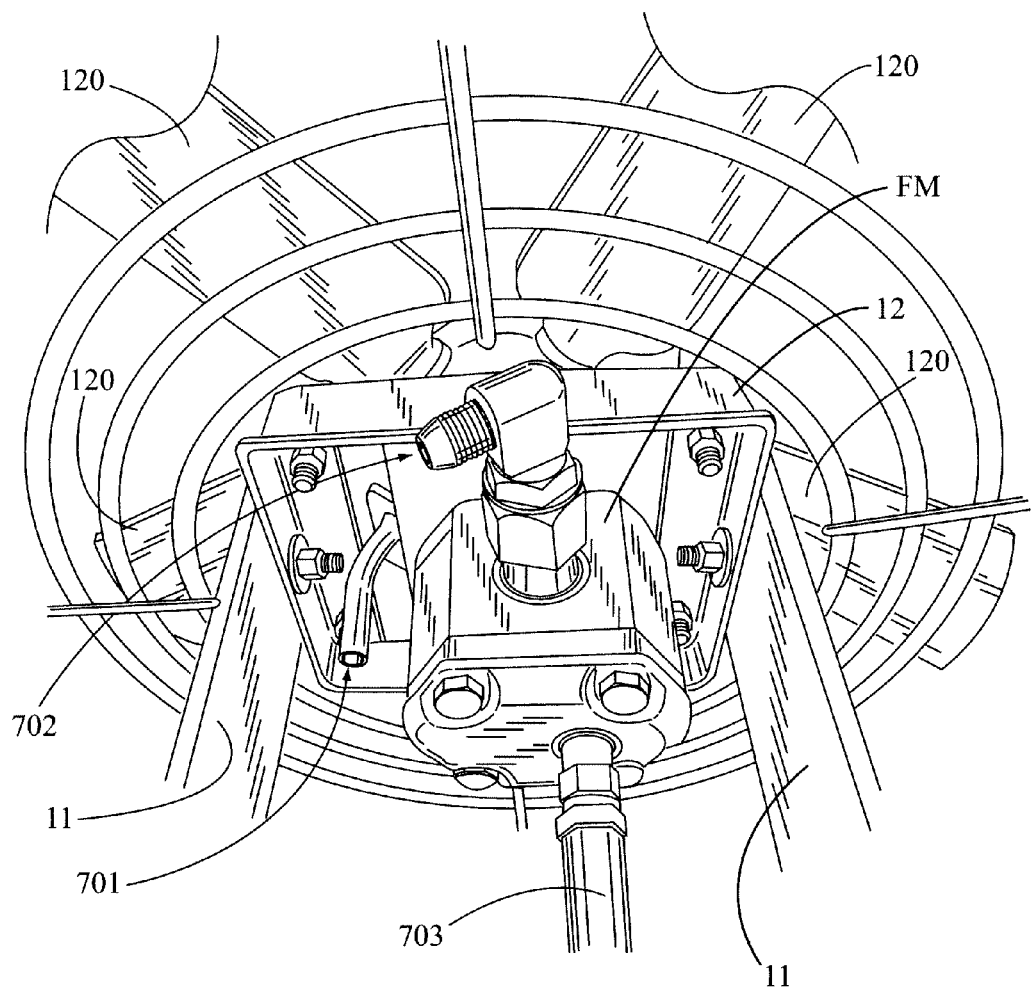
FIG. 7 (prior art) is a bottom perspective view of the evaporator fan.

FIG. 7 (prior art) shows the wastewater inlet 701 which connects to the dissipater 121 shown in FIG. 6. The fan motor FM receives hydraulic fluid at inlet 702 and returns the fluid in return 703.

Figure 8:
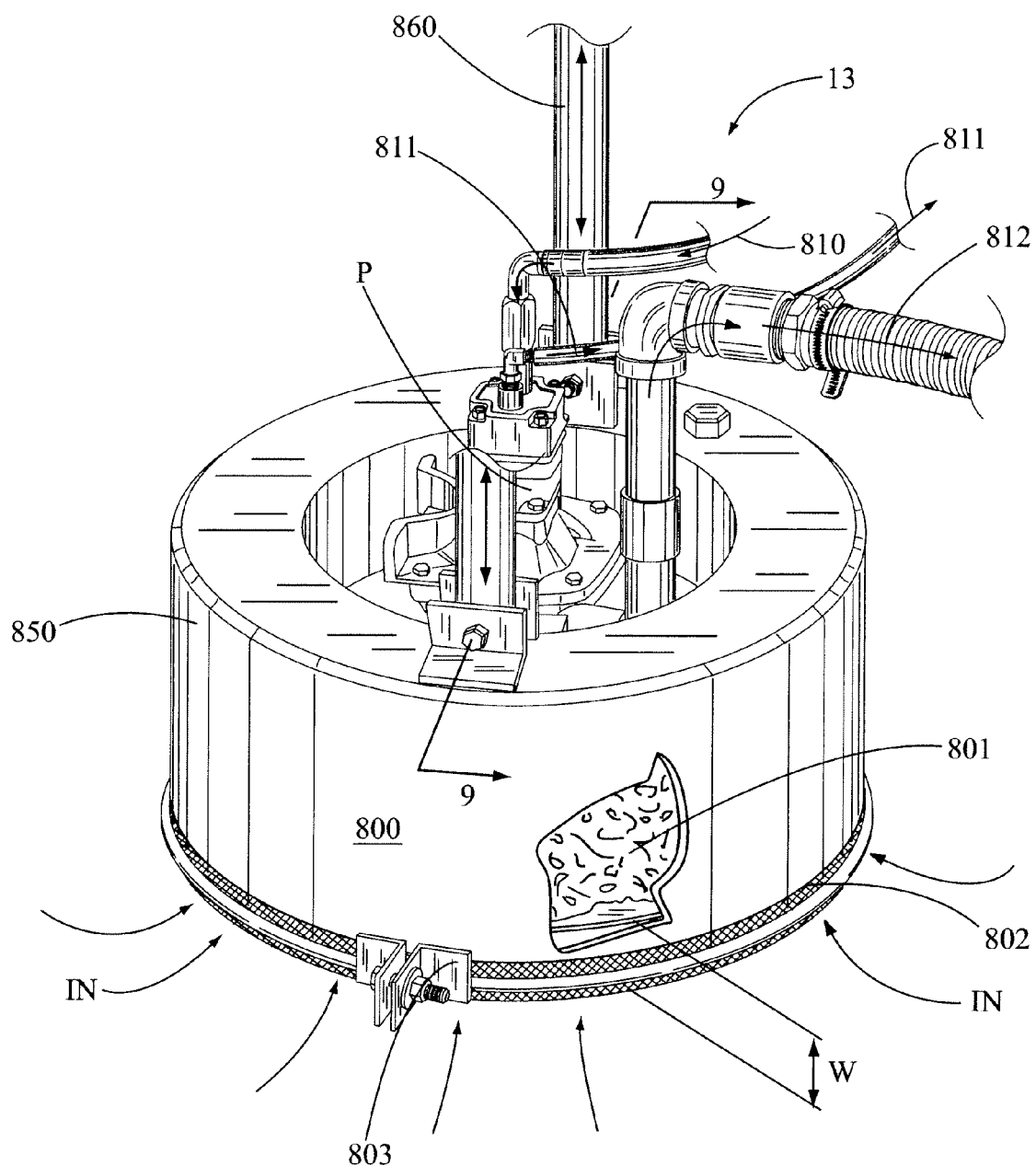
FIG. 8 is a top perspective view of the pump inlet assembly.

Referring next to FIG. 8 the pump inlet assembly 13 has a casing 800 which covers a foam filled cavity 801. A screen 802 receives water shown by arrows IN. Nominally h=two inches. The screen 802 is serviceable via lock 803. The gap shown by h provides a vortex breaker design to prevent air from being sucked in which would cause the pump to lose its prime. The pump P is powered by hydraulic line 810 with return line 811. The wastewater outlet 812 supplies the manifold 41 shown in FIG. 4.

Support rods 850, 860 are used to manually set the assembly 13 at a desired depth for continuous, unattended operation. These support rods actually stop the float when the water level falls to a predetermined level below the point where the pump float will not float anymore.

Figure 9:
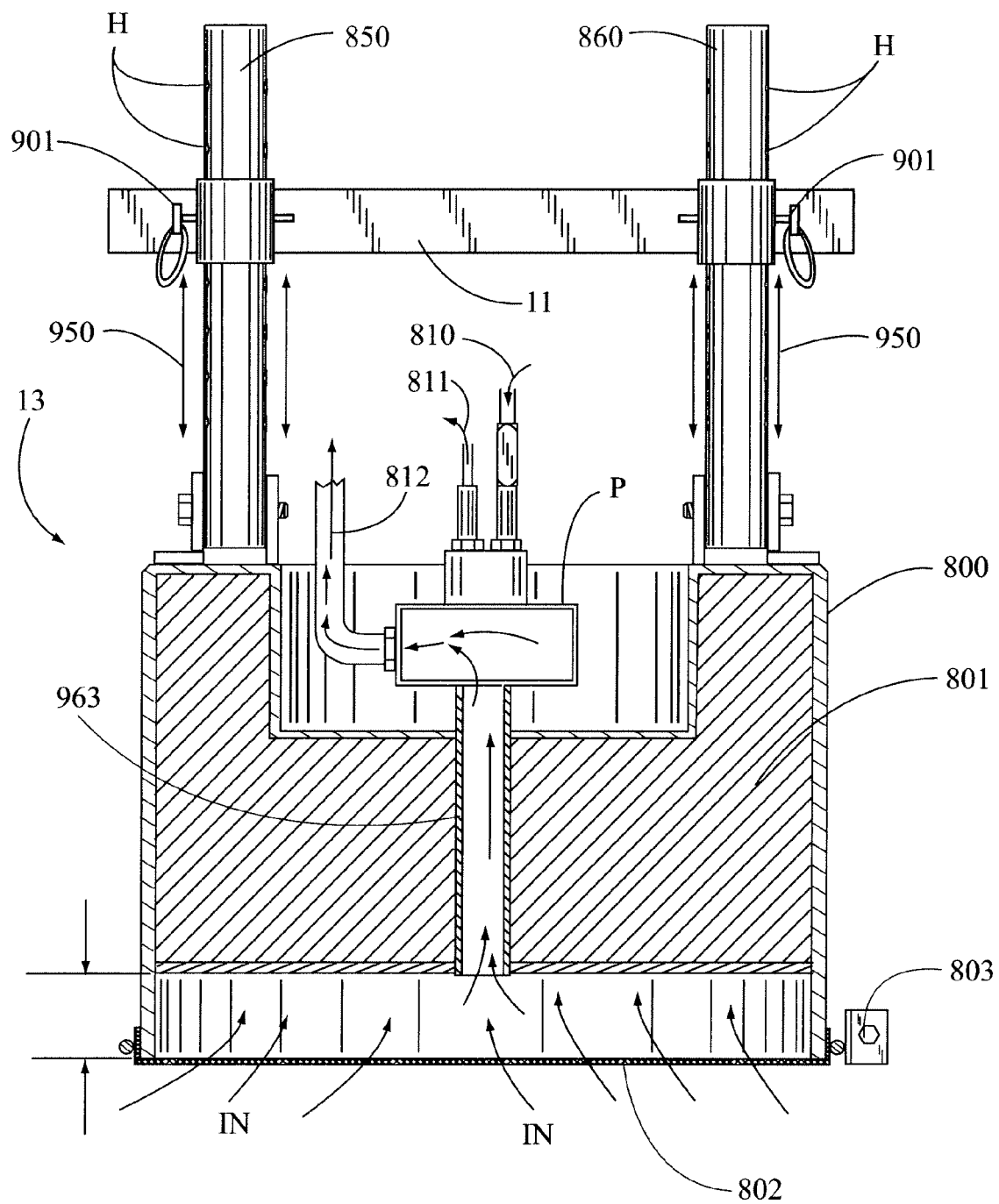
FIG. 9 is a cross sectional view of the pump inlet assembly taken along line 9-9 of FIG. 8.

FIG. 9 shows the rods 850, 860 having mounting holes H for locking pins 901. Arrows 950 show the up/down adjustability of the depth of the assembly 13. An inlet pipe 963 feeds the screened wastewater to the pump P.

Figure 12:
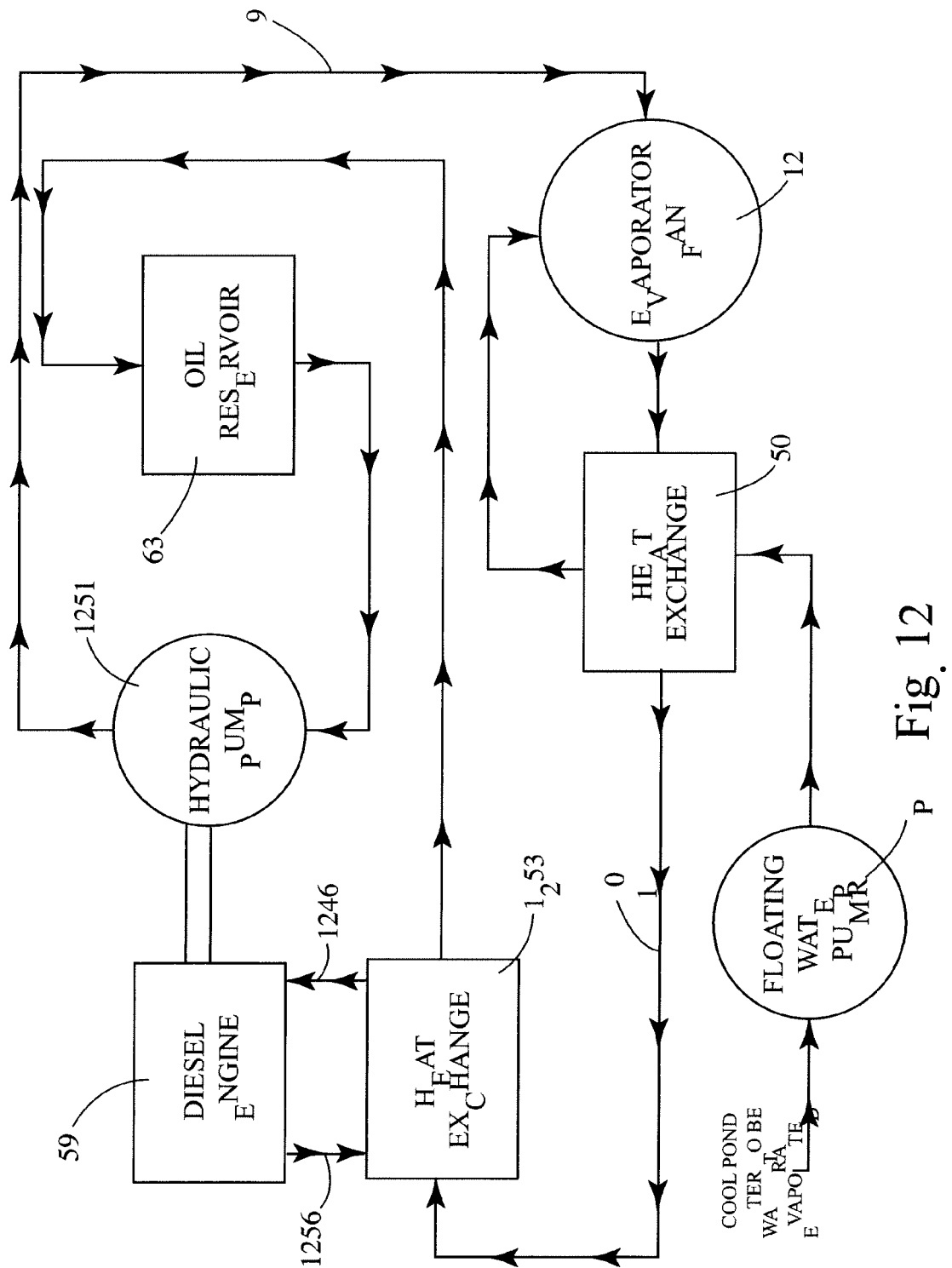
FIG. 12 is a flow chart of the diesel engine to hydraulic fluid heat exchange and pond water heat exchange systems.
Figure 13:
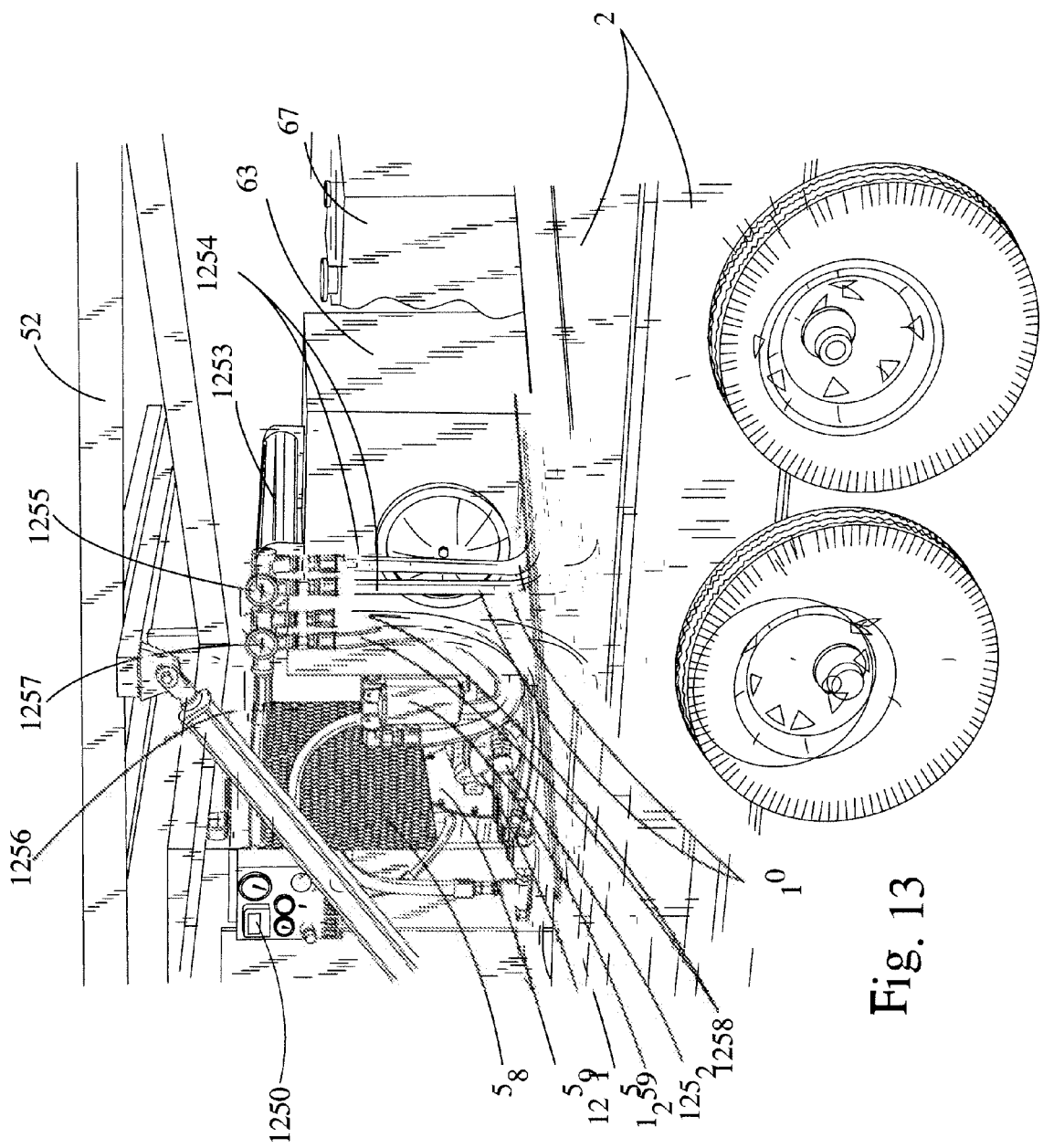
FIG. 13 is a side perspective view of the trailer's diesel engine, hydraulic power pump and heat exchanger.
Figure 14:
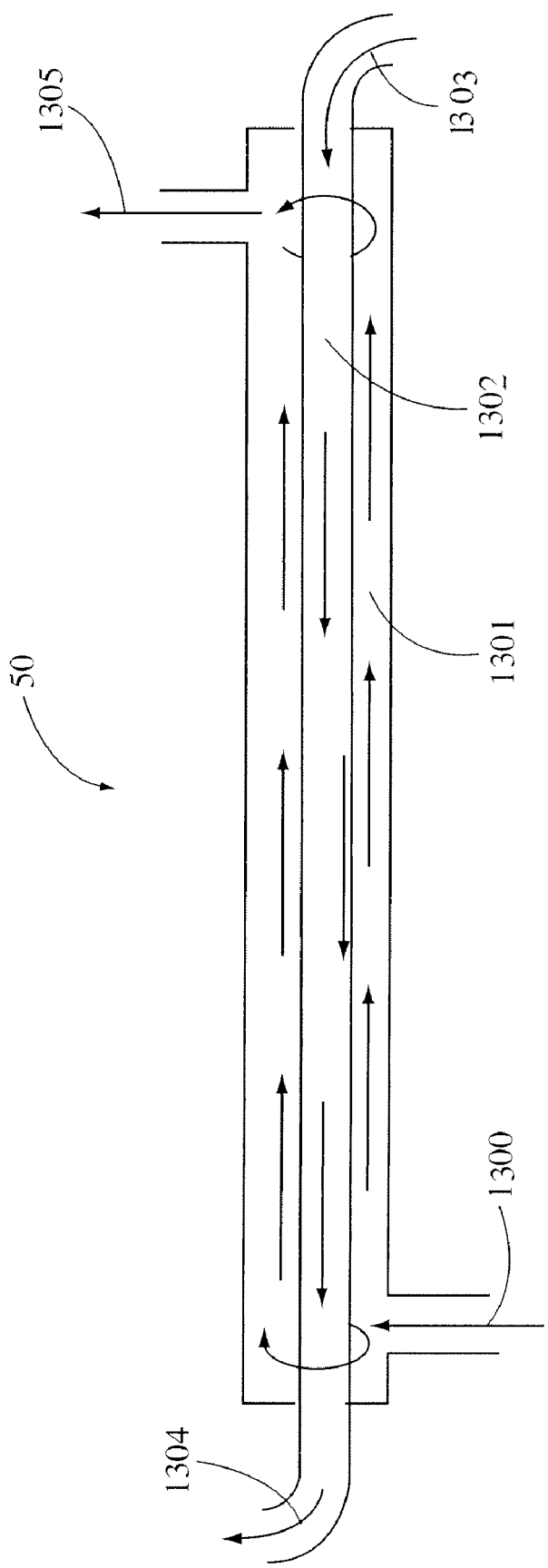
FIG. 14 is a schematic view of the watercraft mounted heat exchanger for the spent hydraulic fluid.

In FIG. 12, the pond water pump P sends pond water to the heat exchanger 50 shown in detail in FIG. 14. After heating the pond water in heat exchanger 50, the spent hydraulic fluid passes through return lines 10 shown in FIG. 1. Lines 10 connect to heat exchanger 1253 shown in FIG. 13. Heat exchanger 1253 receives hot coolant water from diesel engine 50 via line 1256. This coolant water is returned to the diesel engine via line 1246. The diesel engine 59 drives the hydraulic pump 1251.

The spent hydraulic fluid in line 10 goes to heat exchanger 1253 and then to oil reservoir 63 on the trailer 2 shown in FIG. 13. The hydraulic pump 1251 pressurizes this heated fluid and sends it via line 9 to the raft 4.

FIG. 13 shows the trailer 2 supporting a diesel engine 59, diesel engine housing 58, and diesel engine controls 1250. The diesel engine turns the main hydraulic pump 1251, sending hydraulic fluid to the high pressure manifold 1252. This manifold 1252 feeds lines 9 of FIG. 1.

The return hydraulic lines 10 of FIG. 1 are shown piped to the heat exchanger 1253 at junction 1254. Incoming fluid pressure is indicated at gauge 1255. The heat exchanger is heated by diesel coolant line 1256. The exiting fluid temperature is indicated at gauge 1257. The exiting heated fluid is piped at 1258 through filter 1259 to hydraulic reservoir 63. From the reservoir 63 the heated fluid is fed to the main hydraulic pump 1251 and to line 9.

FIG. 14 depicts the watercraft mounted heat exchanger 50. This heat exchanger pre-heats the water from the pond/water reservoir 5 of FIG. 2 before it is sent to the fans 12 of FIG. 2.

Water inlet 1300 receives water from pump P of FIG. 8. A chamber 1301 circulates the water from inlet 1300 around a pipe 1302 which is heated by spent hydraulic fluid from oil inlet 1303. This spent hydraulic fluid is drawn from the manifold 401 of FIG. 4. Hydraulic fluid exit port 1304 returns to the manifold 401. Heated water exit port 1305 supplies the pond water to the fans 12.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A pond water evaporator comprising:
   a watercraft having a pump to propel pond water to an onboard heat exchanger;
   said onboard heat exchanger having a fluid connection to a plurality of onboard atomizing fans;
   said onboard atomizing fans each having a hydraulic actuator which expels spent hydraulic fluid to the onboard heat exchanger and then to a hydraulic power pump which provides pressure and recirculation to the hydraulic fluid; and
   wherein the pressurized recirculated hydraulic fluid powers the fan(s) hydraulic actuator (s).

2. The apparatus of claim 1, wherein the hydraulic power pump is land based.

3. The apparatus of claim 2, wherein the hydraulic power pump is mounted on a trailer which can transport the watercraft.

4. The apparatus of claim 3, wherein the trailer has an engine which powers the hydraulic power pump wherein the engine has a water cooling system that heats a trailer mounted heat exchanger which heats a supply of spent hydraulic fluid from the watercraft before said fluid is sent to the hydraulic power pump.

5. The apparatus of claim 1, wherein each atomizing fan has a dissipater which sprays water droplets above a spinning fan blade; and wherein the plurality of onboard atomizing fans comprises at least twelve fans.

6. The apparatus of claim 1, wherein the watercraft pump is hydraulically powered.

7. The apparatus of claim 1, wherein the watercraft is a pontoon raft; and wherein the raft is tethered to land.

8. The apparatus of claim 3, wherein the trailer has an upper frame which supports the watercraft in transit; and wherein the trailer has a hydraulic power line reel and a hydraulic return line reel.

9. The apparatus of claim 6, wherein the pump has a vortex breaker design to prevent the pump from losing its prime by sucking in air.

10. The apparatus of claim 6, wherein the watercraft pump feeds an onboard pond water manifold which then supplies pond water to each atomizing fan; and wherein each fan hydraulic actuator expels the spent hydraulic fluid to an onboard spent fluid manifold, which then connects to a hose to the land based hydraulic power pump.

11. An evaporator system comprising:

a watercraft having a pump to propel a fluid from a body or fluid which floats the watercraft to a plurality of onboard atomizing fans;

said atomizing fans powered by a hydraulic actuator which expels spent hydraulic fluid to a land based hydraulic power pump; and wherein the land based hydraulic power pump pressurizes and recirculates the spent hydraulic fluid back to the hydraulic actuators.

12. The apparatus of claim 11 further comprising an onboard heat exchanger which uses spent hydraulic fluid from the hydraulic actuator to preheat a fluid output from the pump prior to the fluid reaching the atomizing fans.

13. The apparatus of claim 11, wherein the land based hydraulic power pump is powered by a water cooled engine connected to a heat exchanger to preheat the spent hydraulic fluid before it is fed to the hydraulic power pump.

14. The apparatus of claim 12, wherein the land based hydraulic power pump is powered by a water cooled engine connected to a heat exchanger to preheat the spent hydraulic fluid before it is fed to the hydraulic power pump.

15. The apparatus of claim 13, wherein the land based hydraulic power pump is mounted on a trailer that can transport the watercraft.

16. The apparatus of claim 11, wherein the pump has a vortex breaker design to prevent the pump from losing its prime by sucking air.

17. A transportable evaporator system comprising:

a watercraft having a pump to propel fluid from a body of fluid which floats the watercraft to a plurality of onboard atomizing fans; and said atomizing fans powered by a land based generator which is transportable on a trailer which is capable of also transporting the watercraft.

18. The apparatus of claim 17, wherein the generator is a hydraulic power pump.

19. The apparatus of claim 18 further comprising a watercraft based heat exchanger which uses spent hydraulic fluid from the fans to preheat the fluid from the atomizing fans.

20. The apparatus of claim 18, wherein the hydraulic power pump is powered by a water cooled engine connected to a heat exchanger which preheats a supply of spent hydraulic fluid from the fans before the spent hydraulic fluid reaches the hydraulic power pump.

* * * * *